United States Patent
Liao et al.

(10) Patent No.: US 10,990,920 B2
(45) Date of Patent: Apr. 27, 2021

(54) DELIVERY METHOD AND SYSTEM OF RECYCLABLE LOGISTICS APPARATUS (71) Applicant: SHANGHAI HONGYAN RETURNABLE TRANSIT PACKAGINGS CO., LTD., Shanghai (CN)

(72) Inventors: Qingxin Liao, Shanghai (CN); Yiwen Cao, Shanghai (CN); Chunjiang Ye, Shanghai (CN); Ping Xue, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 523 days.

(21) Appl. No.: 15/576,596

(22) PCT Filed: May 19, 2016

(86) PCT No.: PCT/CN2016/082629
§ 371 (c)(1),
(2) Date: Nov. 22, 2017

(87) PCT Pub. No.: WO2016/188359
PCT Pub. Date: Dec. 1, 2016

(65) Prior Publication Data
US 2018/0165632 A1 Jun. 14, 2018

(30) Foreign Application Priority Data
May 22, 2015 (CN) .......................... 201510268234.9

(51) Int. Cl.
G06Q 10/08 (2012.01)
H04W 4/38 (2018.01)
(Continued)

(52) U.S. Cl.
CPC ......... *G06Q 10/0833* (2013.01); *G06Q 10/08* (2013.01); *H04W 4/33* (2018.02); *H04W 4/38* (2018.02); *H04W 4/44* (2018.02)

(58) Field of Classification Search
CPC ..... G06Q 10/0833; G06Q 10/08; H04W 4/38; H04W 4/33; H04W 4/44
See application file for complete search history.

(56) References Cited

U.S. PATENT DOCUMENTS 7,299,982 B2 * 11/2007 Kreiner ................. G06Q 10/08
235/375
8,400,268 B1 3/2013 Malik et al.
(Continued)

FOREIGN PATENT DOCUMENTS

CN 101482615 7/2009
CN 201425747 3/2010
(Continued)

OTHER PUBLICATIONS

A Novel RFID-Based Shipping Containers Location and Identification Solution in Multimodal Transport Published by IEEE (Year: 2008).*
(Continued)

*Primary Examiner* — Jeff Zimmerman
*Assistant Examiner* — Zeina Elchanti
(74) *Attorney, Agent, or Firm* — Hamre, Schumann, Mueller & Larson, P.C.

(57) ABSTRACT

The present invention relates to the field of logistics. Disclosed are delivery method and system of recyclable logistics apparatus. Each recyclable logistics apparatus is provided with a wireless tag, the wireless tag is configured to broadcast a wireless signal which contains an apparatus identification; a first wireless sensing network and a second wireless sensing network are pre-set in a first delivery region
(Continued)

and a second delivery region, and are configured to receive wireless signals broadcasted by all wireless tags in a coverage area of the wireless sensing networks. The delivery method comprises the steps: identifying, according to detection results of the first wireless sensing network at two successive moments, identification(s) of logistics apparatus(es) leaving the first delivery region as a first candidate delivery set; similarly, identifying, according to detection results of the second wireless sensing network, identification(s) of logistics apparatus(es) entering the second delivery region as a second candidate delivery set; and taking an intersection of the first candidate delivery set and the second candidate delivery set as a delivery result. The present invention can automatically determine which logistics apparatus(es) is delivered from the first delivery region to the second delivery region, which is especially convenient and efficient when there are a lot of apparatuses, and greatly reduces the workload and time on statistics and check.

4 Claims, 4 Drawing Sheets

(51) Int. Cl.
*H04W 4/33* (2018.01)
*H04W 4/44* (2018.01)

(56) References Cited

U.S. PATENT DOCUMENTS

2003/0030568 A1* 2/2003 Lastinger ................ G07C 9/28
340/8.1
2010/0302010 A1* 12/2010 Iwahashi ................ G06K 17/00
340/10.1

FOREIGN PATENT DOCUMENTS

| CN | 101826144 | 9/2010 |
| CN | 102073836 | 5/2011 |
| CN | 104399677 | 3/2015 |
| WO | 2012/080787 | 6/2012 |

OTHER PUBLICATIONS

Extended European Search Report, issued in the corresponding European application No. 16799248.6, dated Oct. 4, 2018, 11 pages.
International Search Report for international application No. PCT/CN2016/082629, dated Aug. 29, 2016 (4 pages, including English translation).

* cited by examiner

DELIVERY METHOD AND SYSTEM OF RECYCLABLE LOGISTICS APPARATUS

FIELD OF TECHNOLOGY

The present invention relates to the field of logistics, and in particular relates to delivery method and system of recyclable logistics apparatuses.

BACKGROUND

The application of recyclable logistics apparatuses in the current market, is basically confined to the traditional transaction and transport mode between two independent parties, and there is no set of management of a perfect transportation packing system. If the whole process involves the transaction and transportation among multiple parties, it will waste a lot of time and manpower on check and delivery, and the utilization rate of transport containers is also very low.

SUMMARY

The object of the present invention is to provide delivery method and system of recyclable logistics apparatus, which can automatically determine which logistics apparatus(es) is delivered from a first delivery region to a second delivery region, such that it is especially convenient and efficient when there are a lot of apparatuses, and greatly reduces the workload and time on statistics and check.

To solve the above technical problems, an embodiment of the present invention discloses a delivery method of recyclable logistics apparatus, each recyclable logistics apparatus is provided with a wireless tag, the wireless tag is configured to broadcast a wireless signal which at least contains an identification of the recycle logistics apparatus;

a first wireless sensing network is pre-set in a first delivery region, and a second wireless sensing network is pre-set in a second delivery region, wherein a wireless sensing network is configured to receive wireless signals broadcasted by wireless tags of all recyclable logistics apparatuses in a coverage area of the wireless sensing network, and each wireless sensing network comprises at least one wireless sensing device;

the delivery method comprises the following steps:

automatically identifying, according to detection results of the first wireless sensing network at two successive moments, identification(s) of recyclable logistics apparatus(es) leaving the first delivery region, as a first candidate delivery set;

automatically identifying, according to detection results of the second wireless sensing network at two successive moments, identification(s) of recyclable logistics apparatus(es) entering the second delivery region, as a second candidate delivery set;

taking an intersection of the first candidate delivery set and the second candidate delivery set as a delivery result from the first delivery region to the second delivery region.

Another embodiment of the present invention discloses a management method for sending apparatuses, comprising the following steps:

receiving by a server, a sending request message sent by a client corresponding to a sending party, the sending request message at least includes quantity of required recyclable logistics apparatus(es) and location information of the sending party;

selecting by the server, a logistics third party that matches the sending request message in a database, and sending by the server, a sending notification message to a client corresponding to the logistics third party;

automatically identifying by the server, according to detection results of a wireless sensing network corresponding to the logistics third party at two successive moments, identification(s) of recyclable logistics apparatus(es) leaving a delivery region of the logistics third party, as a third candidate delivery set;

automatically identifying by the server, according to detection results of a wireless sensing network corresponding to the sending party at two successive moments, identification(s) of recyclable logistics apparatus(es) entering a delivery region of the sending party, as a fourth candidate delivery set;

taking an intersection of the third candidate delivery set and the fourth candidate delivery set as a sending delivery result from the delivery region of the logistics third party to the delivery region of the sending party;

comparing the sending delivery result with the sending request message, and determining a sending delivery from the logistics third party to the sending party is completed if it is consistent.

Another embodiment of the present invention discloses a management method for returning apparatuses, comprising the following steps:

receiving by a server, a returning request message sent by a client corresponding to a receiving party, the returning request message at least includes quantity of recyclable logistics apparatus(es) required to be returned and location information of the receiving party;

selecting by the server, a logistics third party that matches the returning request message in a database, and sending by the server, a returning notification message to a client corresponding to the logistics third party;

automatically identifying by the server, according to detection results of a wireless sensing network corresponding to the receiving party at two successive moments, identification(s) of recyclable logistics apparatus(es) leaving a delivery region of the receiving party, as a seventh candidate delivery set;

automatically identifying by the server, according to detection results of a wireless sensing network corresponding to the logistics third party at two successive moments, identification(s) of recyclable logistics apparatus(es) entering a delivery region of the logistics third party, as an eighth candidate delivery set;

taking an intersection of the seventh candidate delivery set and the eighth candidate delivery set as a returning delivery result from the delivery region of the receiving party to the delivery region of the logistics third party;

comparing the sending delivery result with the returning request message, and determining a returning delivery is completed if it is consistent.

Another embodiment of the present invention further discloses a delivery system of recyclable logistics apparatus, each recyclable logistics apparatus is provided with a wireless tag, the wireless tag is configured to broadcast a wireless signal which at least contains an identification of the recycle logistics apparatus;

a first wireless sensing network is pre-set in a first delivery region, and a second wireless sensing network is pre-set in a second delivery region, wherein a wireless sensing network is configured to receive wireless signals broadcasted by wireless tags of all recyclable logistics apparatuses in a coverage area of the wireless sensing network, and each wireless sensing network comprises at least one wireless sensing device;

the delivery system comprises the following components:

a first delivery region recognition component, which is configured to automatically identify, according to detection results of the first wireless sensing network at two successive moments, identification(s) of recyclable logistics apparatus(es) leaving the first delivery region, as a first candidate delivery set;

a second recognition component, which is configured to automatically identify, according to detection results of the second wireless sensing network at two successive moments, identification(s) of recyclable logistics apparatus(es) entering the second delivery region, as a second candidate delivery set;

a delivery result decision component, which is configured to take an intersection of the first candidate delivery set and the second candidate delivery set as a delivery result from the first delivery region to the second delivery region.

Another embodiment of the present invention further discloses a management system for sending apparatuses, comprising the following components:

a sending request receiving component, which is configured to receive a sending request message sent by a client corresponding to a sending party, the sending request message at least includes quantity of required recyclable logistics apparatus(es) and location information of the sending party;

a sending match notification component, which is configured to select a logistics third party that matches the sending request message in a database and send a sending notification message to a client corresponding to the logistics third party;

a third automatic recognition component, which is configured to automatically identify, according to detection results of a wireless sensing network corresponding to the logistics third party at two successive moments, identification(s) of recyclable logistics apparatus(es) leaving a delivery region of the logistics third party, as a third candidate delivery set;

a fourth automatic recognition component, which is configured to automatically identify, according to detection results of a wireless sensing network corresponding to the sending party at two successive moments, identification(s) of recyclable logistics apparatus(es) entering a delivery region of the sending party, as a fourth candidate delivery set;

a first sending delivery component, which is configured to take an intersection of the third candidate delivery set and the fourth candidate delivery set as a sending delivery result from the delivery region of the logistics third party to the delivery region of the sending party;

a first sending delivery decision component, which is configured to compare the sending delivery result with the sending request message, and determine a sending delivery from the logistics third party to the sending party is completed if it is consistent.

Another embodiment of the present invention further discloses a management system for returning apparatuses, comprising the following components:

a returning request receiving component, which is configured to receive a returning request message sent by a client corresponding to a receiving party, the returning request message at least includes quantity of recyclable logistics apparatus(es) required to be returned and location information of the receiving party;

a returning match notification component, which is configured to select a logistics third party that matches the returning request message in a database and send a returning notification message to a client corresponding to the logistics third party;

a seventh automatic recognition component, which is configured to automatically identify, according to detection results of a wireless sensing network corresponding to the receiving party at two successive moments, identification(s) of recyclable logistics apparatus(es) leaving a delivery region of the receiving party, as a seventh candidate delivery set;

an eighth automatic recognition component, which is configured to automatically identify, according to detection results of a wireless sensing network corresponding to the logistics third party at two successive moments, identification(s) of recyclable logistics apparatus(es) entering a delivery region of the logistics third party, as an eighth candidate delivery set;

taking an intersection of the seventh candidate delivery set and the eighth candidate delivery set as a returning delivery result from the delivery region of the receiving party to the delivery region of the logistics third party;

comparing the returning delivery result with the returning request message, and determining a returning delivery is completed if it is consistent.

The main differences between the embodiments of the present invention and the prior art are that:

It can automatically determine which recyclable logistics apparatus(es) is delivered from a first delivery region to a second delivery region, which is especially convenient and efficient when there are a lot of recyclable logistics apparatuses.

The delivery method is applied to the management method for sending apparatuses, automatically determining a sending delivery result from a delivery region of a logistics third party to a delivery region of a sending party and automatically determining whether a sending delivery from the logistics third party to the sending party is completed or not by determining whether the sending delivery result is consistent with the sending request message.

The delivery method is applied to the management method for returning apparatuses, automatically determining a returning delivery result from a delivery region of a receiving party to a delivery region of a logistics third party and automatically determining a returning delivery from the receiving party to the logistics third party is completed or not by determining whether the returning delivery result is consistent with the returning request message.

Further, a delivery region is provided with a wireless sensing network comprising a plurality of wireless sensing devices, the detection range of the wireless sensing network covers the entire delivery region, the identification(s) of disappeared or added recyclable logistics apparatus(es) is obtained by detecting identifications of all recyclable logistics apparatuses in the entire delivery region at two successive moments and making comparison, thus the identification(s) of recyclable logistics apparatus(es) leaving or entering the delivery region can be automatically identified.

Further, two wireless sensing devices are provided respectively in a delivery region in a direction of leaving the delivery region and in a direction of entering the delivery region, the detection ranges of the wireless sensing devices cover an entrance and an exit, and the two wireless sensing devices successively detect an identification of a recyclable logistics apparatus, thus the identification of the recyclable logistics apparatus leaving or entering the delivery region can be automatically detected.

EMBODIMENTS

In the following description, numerous technical details are set forth to provide the reader a better understanding of the present invention. However, those skilled in the art should understand that even without these technical details and not based on various changes and modifications of the following embodiments, the technical solutions claimed in the claims of the present application can also be implemented.

To make the objectives, technical solutions and advantages of the present invention clear, the embodiments of the present invention are further described in detail below with reference to the accompanying drawings.

Figure 1:
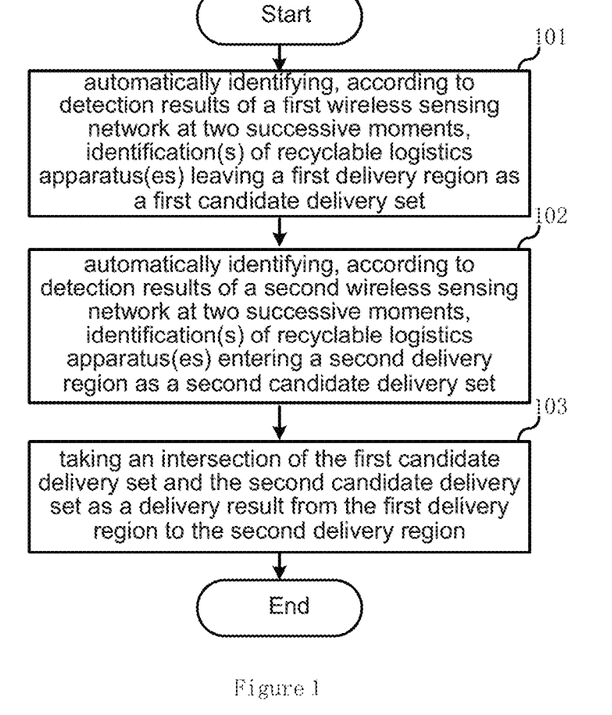
FIG. 1 is a flow schematic chart of a delivery method of recyclable logistics apparatus according to a first embodiment of the present invention.

The first embodiment of the present invention relates to a delivery method of recyclable logistics apparatuses. FIG. 1 is a flow schematic chart of the delivery method of recyclable logistics apparatuses.

Each recyclable logistics apparatus is provided with a wireless tag, the wireless tag is configured to broadcast a wireless signal which at least contains an identification of the recycle logistics apparatus.

A first wireless sensing network is pre-set in a first delivery region, and a second wireless sensing network is pre-set in a second delivery region, wherein the wireless sensing network is used to receive wireless signals broadcasted by wireless tags of all recyclable logistics apparatuses in a coverage area of the wireless sensing network, and each wireless sensing network comprises at least one wireless sensing device.

As shown in FIG. 1, the delivery method comprises the following steps:

In the step 101, automatically identifying, according to detection results of a first wireless sensing network at two successive moments, identification(s) of recyclable logistics apparatus(es) leaving a first delivery region as a first candidate delivery set.

Then proceeds to step 102, automatically identifying, according to detection results of a second wireless sensing network at two successive moments, identification(s) of recyclable logistics apparatus(es) entering a second delivery region as a second candidate delivery set.

Then proceeds to step 103, taking an intersection of the first candidate delivery set and the second candidate delivery set as a delivery result from the first delivery region to the second delivery region.

It is to be understood that a delivery region may refer to a region where all users of recyclable logistics apparatuses and all other associated customers such as a sending party, a logistics third party or a receiving party are located.

Delivery may include empty recyclable logistics apparatus(es) leaving the logistics third party and entering the sending party, full recyclable logistics apparatus(es) leaving the sending party and entering the receiving party, empty recyclable logistics apparatus(es) leaving the receiving party and entering the logistics third party. Scenes involved in this process can all be seen as delivery from one delivery region to another delivery region.

The present embodiment can automatically determine which recyclable logistics apparatus(es) is delivered from a first delivery region to a second delivery region, which is especially convenient and efficient when there are a lot of recyclable logistics apparatuses.

Figure 2:
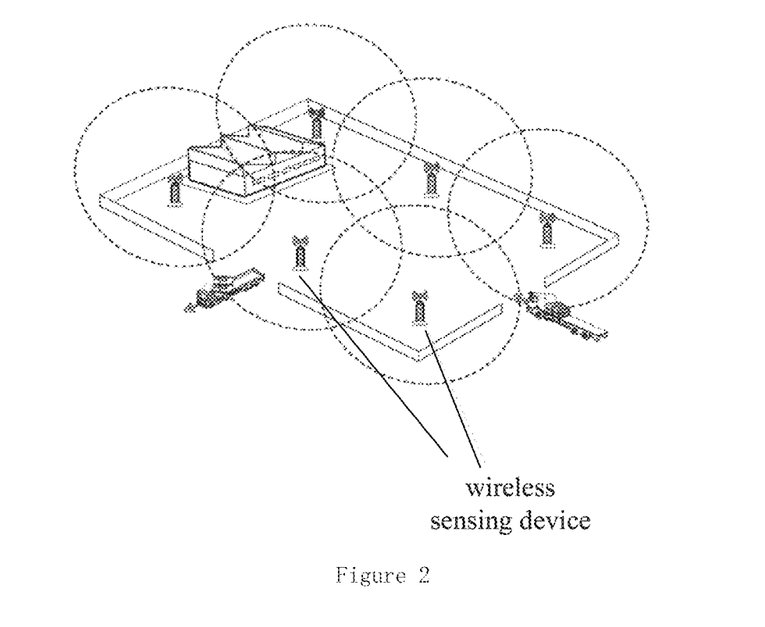
FIG. 2 is a schematic view of a wireless sensing network coverage layout used in the delivery method of recyclable logistics apparatus according to a second embodiment of the present invention.

The second embodiment of the present invention relates to a delivery method of recyclable logistics apparatuses. The second embodiment is improved based on the first embodiment, and the main improvements are: the delivery region is provided with a wireless sensing network comprising a plurality of wireless sensing devices, the wireless sensing network covers the delivery region, the_identification(s) of disappeared or added recyclable logistics apparatus(es) is obtained by detecting identifications of all recyclable logistics apparatuses in the entire delivery region at two successive moments and making comparison, thus the identification(s) of the recyclable logistics apparatus(es) leaving or entering the delivery region can be automatically identified. Specifically, First, FIG. 2 is a schematic view of the wireless sensing network coverage layout used in the delivery method of recyclable logistics apparatuses according to a second embodiment of the present invention. As shown in this Figure, the delivery region is provided with a wireless sensing network comprising a plurality of wireless sensing devices, and the wireless sensing network covers the delivery region. Identifications of all recyclable logistics apparatuses in the entire delivery region detected by the wireless sensing network are obtained at two successive moments and compared, thus the recyclable logistics apparatus(es) leaving or entering the delivery region can be identified.

The above wireless sensing network coverage layout is applied to two delivery regions respectively, the first wireless sensing network covers the first delivery region, and the second wireless sensing network covers the second delivery region.

Accordingly, the step 101 comprises the following sub-steps:

obtaining at a first moment, identifications of all recyclable logistics apparatuses in the first delivery region detected by the first wireless sensing network, as a first identification set;

obtaining at a second moment after the first moment, identifications of all recyclable logistics apparatuses in the first delivery region detected by the first wireless sensing network, as a second identification set;

taking the identification(s) of recyclable logistics apparatus(es) which disappears in the second identification set relative to the first identification set, as the first candidate delivery set.

Accordingly, the step 102 comprises the following substeps:

obtaining at a third moment after the second moment, identifications of all recyclable logistics apparatuses in the second delivery region detected by the second wireless sensing network, as a third identification set;

obtaining at a fourth moment after the third moment, identifications of all recyclable logistics apparatuses in the second delivery region detected by the second wireless sensing network, as a fourth identification set;

taking the identification(s) of recyclable logistics apparatus(es) which newly appears in the fourth identification set relative to the third identification set, as the second candidate delivery set.

It is to be understood that concepts of the first moment, the second moment, the third moment and the fourth moment when identifications of all recyclable logistics apparatuses in the delivery region are obtained are not constant. In a preferred embodiment, the wireless sensing device may periodically (e.g., once every minute) receive wireless signals broadcasted by wireless tags of all recyclable logistics apparatuses in the region to obtain identifications of all recyclable logistics apparatuses. For example, if an identification is newly added in the identification set acquired at the current moment relative to the identification set acquired one minute ago, it indicates that a recyclable logistics apparatus is warehoused; on the contrary, an identification disappearing in the identification set acquired at the current moment relative to the identification set acquired one minute ago indicates that a recyclable logistics apparatuses is ex-warehoused.

In the present embodiment, a wireless sensing network in a delivery region comprises a plurality of wireless sensing devices, and the wireless sensing network covers the delivery region. Furthermore, it is to be understood that respective recyclable logistics apparatuses in the wireless sensing network may have overlapping detection range(s), and when the wireless sensing network detects identifications of all recyclable logistics apparatuses in the delivery region, the repeated identifications of recyclable logistics apparatuses detected by the respective wireless sensing devices can be deduplicated. Of course, in other embodiments, the wireless sensing network may also comprise only one wireless sensing device, and the detection range of the wireless sensing network may not cover the delivery region accurately, but the detection region is larger than the entire delivery region.

The third embodiment of the present invention relates to a delivery method of recyclable logistics apparatuses, the third embodiment is basically same as the second embodiment, and the main difference therebetween is that:

In the second embodiment, the delivery region is provided with a wireless sensing network comprising a plurality of wireless sensing devices, the first wireless sensing network covers the first delivery region, and the second wireless sensing network covers the second delivery region;

Whereas in the present embodiment, a first and a second wireless sensing devices are provided at an exit of the first delivery region in a direction of leaving the first delivery region, and a third and a fourth wireless sensing devices are provided at an entrance of the second delivery region in a direction of entering the second delivery region.

Figure 3:
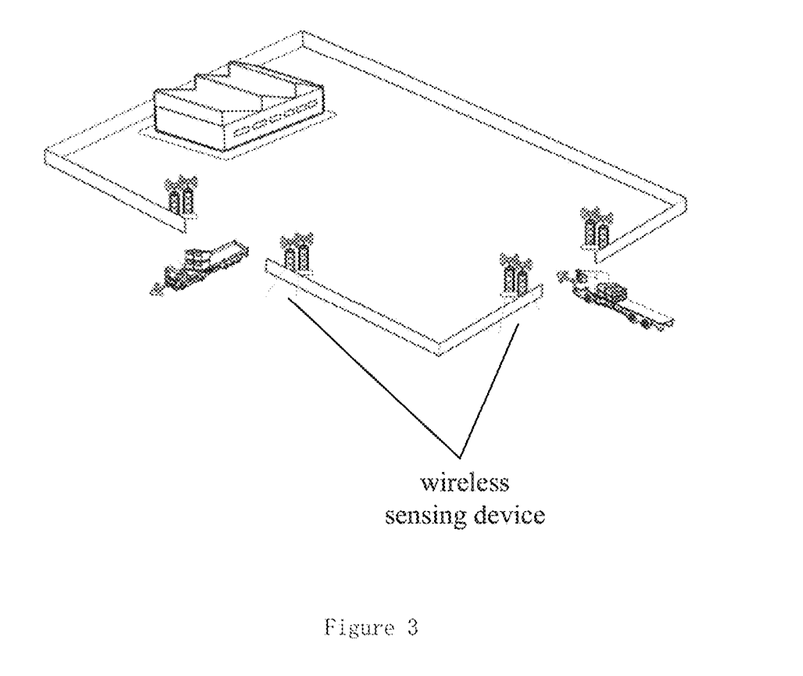
FIG. 3 is a schematic view of the wireless sensing network entrance layout and exit layout used in the delivery method of recyclable logistics apparatus according to a third embodiment of the present invention.

FIG. 3 is a schematic view of the wireless sensing network entrance layout and exit layout used in the delivery method of recyclable logistics apparatuses. As shown in the figure, two wireless sensing devices are provided respectively at the exit of the delivery region in the direction of leaving the delivery region and at the entrance of the delivery region in the direction of entering the delivery region.

The above wireless sensing network entrance layout and exit layout are respectively applied to the two delivery regions, the first and the second wireless sensing devices are provided at the exit of the first delivery region in the direction of leaving the first delivery region, and the third and the forth wireless sensing devices are provided at the entrance of the second delivery region in the direction of entering the second delivery region.

Correspondingly, the step in the first embodiment of "automatically identifying, according to detection results of a first wireless sensing network at two successive moments, identification(s) of recyclable logistics apparatus(es) leaving a first delivery region" comprises the following step:

determining an identification of a recyclable logistics apparatus as an identification of a recyclable logistics apparatus leaving the first delivery region if the first and the second wireless sensing devices have successively detected the identification of the recyclable logistics apparatus.

Correspondingly, the step in the first embodiment of "automatically identifying, according to detection results of a second wireless sensing network at two successive moments, identification(s) of recyclable logistics apparatus(es) entering a second delivery region" comprises the following step:

determining an identification of a recyclable logistics apparatus as an identification of a recyclable logistics apparatus entering the second delivery region if the third and the fourth wireless sensing devices have successively detected the identification of the recyclable logistics apparatus.

It is to be understood that if the first and the second wireless sensing devices successively detect an identification of a recyclable logistics apparatus, and then the third and the fourth wireless sensing devices successively detect the identification of the recyclable logistics apparatus, it is determined that the recyclable logistics apparatus is delivered from the first delivery region to the second delivery region.

In the present embodiment, two wireless sensing devices are provided respectively in a delivery region in a direction of leaving the delivery region and in a direction of entering the delivery region, and the two wireless sensing devices successively detect an identification of a recyclable logistics apparatus, thus the identification of the recyclable logistics apparatus leaving or entering the delivery region can be automatically detected.

The fourth embodiment of the present invention relates to a management method for sending apparatuses, and the management method for sending apparatuses comprises the following steps:

receiving by a server, a sending request message sent by a client corresponding to a sending party, the sending request message at least includes quantity of required recyclable logistics apparatuses and location information of the sending party;

selecting by the server, a logistics third party that matches the sending request message in a database, and sending by the server, a sending notification message to a client corresponding to the logistics third party;

automatically identifying by the server, according to detection results of a wireless sensing network corresponding to the logistics third party at two successive moments, identification(s) of recyclable logistics apparatus(es) leaving a delivery region of the logistics third party, as a third candidate delivery set;

automatically identifying by the server, according to detection results of a wireless sensing network corresponding to the sending party at two successive moments, identification(s) of recyclable logistics apparatus(es) entering a delivery region of the sending party, as a fourth candidate delivery set;

taking an intersection of the third candidate delivery set and the forth candidate delivery set as a sending delivery result from the delivery region of the logistics third party to the delivery region of the sending party;

comparing the sending delivery result with the sending request message, if they are consistent, determining a sending delivery from the logistics third party to the sending party is completed.

In addition, it is to be understood that the logistics third party that matches the sending request message may refer to: the quantity of recyclable logistics apparatuses of the logistics third party satisfies the quantity of required recyclable logistics apparatuses in the sending request message, and the distance between the location of the sending party in the sending request message and the location of the logistics third party satisfies a certain distance range.

In addition to one-to-one relationship between the sending party and the logistics third party, there may further exist the following situations:

a plurality of sending parties send sending requests, and a certain logistics third party with enough empty containers storage is closest to all these sending parties, then the logistics third party will simultaneously issue multiple batches of fleets to supply the plurality of sending parties;

one sending party sends a sending request, and at this time none of the logistics third parties can supply enough empty containers, then the server will assign a plurality of optimal logistics third parties to simultaneously supply the sending party;

in addition to the above two kinds of multiple-to-one or one-to-multiple cases, a multiple-to-multiple case may also occur, such as two-to-three, three-to-five and so on.

When a certain logistics third party simultaneously supply recyclable logistics apparatuses to a plurality of sending parties, although a third candidate delivery set of all recyclable logistics apparatuses leaving the logistics third party is not completely same as a fourth candidate delivery set of recyclable logistics apparatuses entering a certain sending party, a delivery result from the logistics third party to this sending party can be obtained by selecting an intersection of the two candidate delivery sets. Through the above mechanism, even if there simultaneously exist situations of multiple sending parties to multiple logistics third parties, it will not lead to confusion.

In the present embodiment, the delivery method of the first to the third embodiments is applied to the management method for sending apparatuses, automatically determining a sending delivery result from a delivery region of a logistics third party to a delivery region of a sending party and automatically determining whether a sending delivery from the logistics third party to the sending party is completed or not by determining whether the sending delivery result is consistent with the sending request message.

Preferably, the sending request message further includes location information of a receiving party, and the management method for sending apparatuses further comprises the following steps:

automatically identifying by the server, according to detection results of a wireless sensing network of the sending party at two successive moments, identification(s) of recyclable logistics apparatus(es) leaving the delivery region of the sending party as a fifth candidate delivery set;

automatically identifying by the server, according to detection results of a wireless sensing network of the receiving party corresponding to the sending request message at two successive moments, identification(s) of recyclable logistics apparatus(es) entering a delivery region of the receiving party, as a sixth candidate delivery set;

taking an intersection of the fifth candidate delivery set and the sixth candidate delivery set as a delivery result from the delivery region of the sending party to the delivery region of the receiving party;

comparing the delivery result with the sending request message, if they are consistent, determining a sending delivery from the sending party to the receiving party is completed.

In addition, it is to be understood that when a sending party needs to supply a plurality of receiving parties, a logistics third party will assign a corresponding number of fleets to meet the transportation requirements of supplying a plurality of receiving parties. Correspondingly, the sending request message includes location information of a plurality of receiving parties, when an intersection of, a union of sixth candidate delivery sets of identifications of recyclable logistics apparatuses entering delivery regions of respective receiving parties which are automatically identified by wireless sensing networks of the plurality of receiving parties and a fifth candidate delivery set of the sending party, satisfies the sending request message, a sending delivery from the sending party to the receiving parties is determined to be completed.

The fifth embodiment of the present invention relates to a management method for returning apparatus, the management method for returning apparatuses comprises the following steps:

receiving by a server, a returning request message sent by a client corresponding to a receiving party, the returning request message at least includes quantity of recyclable logistics apparatuses required to be returned and location information of the receiving party;

selecting by the server, a logistics third party that matches the returning request message in a database, and sending by the server, a returning notification message to a client corresponding to the logistics third party;

automatically identifying by the server, according to detection results of a wireless sensing network corresponding to the receiving party at two successive moments, identification(s) of recyclable logistics apparatus(es) leaving a delivery region of the receiving party, as a seventh candidate delivery set;

automatically identifying by the server, according to detection results of a wireless sensing network corresponding to the logistics third party at two successive moments, identification(s) of recyclable logistics apparatus(es) entering a delivery region of the logistics third party, as an eighth candidate delivery set;

taking an intersection of the seventh candidate delivery set and the eighth candidate delivery set as a returning delivery result from the delivery region of the receiving party to the delivery region of the logistics third party;

comparing the returning delivery result with the returning request message, if they are consistent, determining a returning delivery is completed.

In the present embodiment, the delivery method of the first to the third embodiments is applied to the management method for returning apparatuses, automatically determining a returning delivery result from a delivery region of a receiving party to a delivery region of a logistics third party, and automatically determining whether a returning delivery from the receiving party to the logistics third party is completed or not by determining whether the returning delivery result is consistent with the returning request message.

In addition, it is to be understood that when returning apparatuses, there may also exist the above multiple-to-multiple cases, for example:

a plurality of receiving parties send returning requests, and a certain logistics third party with enough storage space is closest to all these receiving parties, then the logistics third party will simultaneously issue multiple batches of fleets to supply the plurality of receiving parties;

one receiving party sends a returning request, and at this time none of the logistics third parties can supply enough storage space for returning apparatuses, then the server will assign a plurality of optimal logistics third parties to simultaneously supply the receiving party;

In addition to the above two kinds of multiple-to-one or one-to-multiple cases, a multiple-to-multiple case may also occur, such as two-to-three, and three-to-five and so on.

Figure 4:
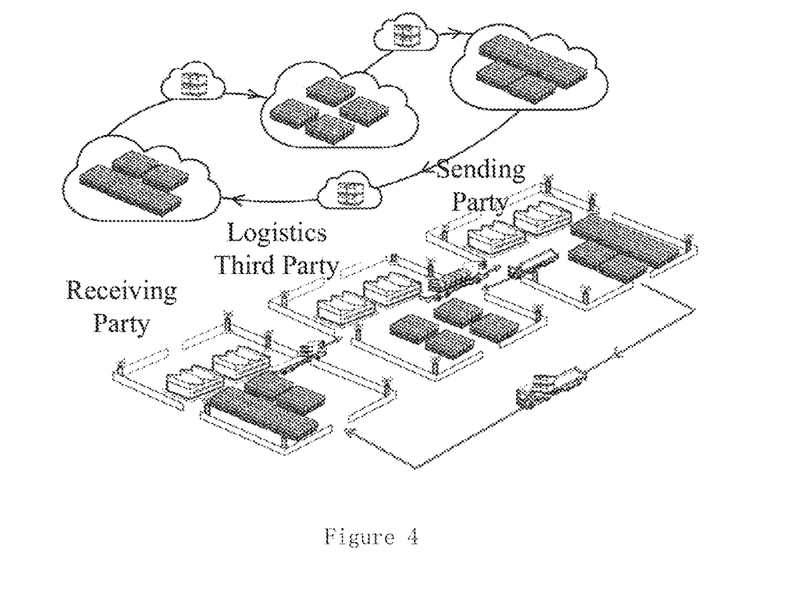
FIG. 4 is a schematic view of a practical application scene of recyclable logistics apparatuses according to a fifth embodiment of the present invention.

In a preferred embodiment, the above management method for sending apparatuses according to the fourth embodiment is combined with the management method for returning apparatuses according to the fifth embodiment, and a schematic view of a practical application scene of recyclable logistics apparatuses is shown in FIG. 4.

As shown in FIG. 4, three users of recyclable logistics apparatuses are included, which are respectively a sending party, a logistics third party and a receiving party, wherein the logistics third party stores empty recyclable logistics apparatuses for using when the sending party delivers goods; the sending party uses the recyclable logistics apparatuses and sends them to the receiving party after packing the recyclable logistics apparatuses with goods; and the receiving party receives the full recyclable logistics apparatuses and returns them to the logistics third party after discharging goods from the full recyclable logistics apparatuses.

The sending party, the logistics third party and the receiving party respectively have corresponding delivery regions, and each delivery region is respectively pre-set with any one of the wireless sensing networks according to the first to the third embodiments. The wireless sensing network receives wireless signals broadcasted by wireless tags of recyclable logistics apparatuses in a coverage area of the wireless sensing network, and each wireless sensing network comprises at least one wireless sensing device.

With the combination of the above management method for sending apparatuses and the management method for returning apparatuses, a set of management of a perfect transportation packing system can be formed which is suitable for the transaction and transportation management among multiple users. The specific procedures are as following:

when the sending party needs to deliver goods, the sending party sends a sending request (time, quantity of goods and information of destination party) to a server by a device such as a computer or a mobile phone, and the server analyzes the distribution and status of logistics apparatuses to select a closest or an optimal logistics third party and forwards the sending information to this logistics third party;

the server automatically identifies, according to identifications detected by a radar at two successive moments before and after empty recyclable logistics apparatus(es) leaves the logistics third party, identification(s) of recyclable logistics apparatus(es) leaving the logistics third party, as a third candidate delivery set;

the server automatically identifies, according to identifications detected by a radar at two successive moments before and after empty recyclable logistics apparatus(es) enters the sending party, identification(s) of recyclable logistics apparatus(es) entering the sending party, as a fourth candidate delivery set;

the empty recyclable logistics apparatus(es) entering the sending party leaves the sending party after being packed with goods, and the server automatically identifies, according to identifications detected by the radar at two successive moments before and after full recyclable logistics apparatuses leaves the sending party, identification(s) of recyclable logistics apparatus(es) leaving the sending party, as a fifth candidate delivery set;

the server automatically identifies, according to identifications detected by a radar at two successive moments before and after full recyclable logistics apparatuses enters the receiving party, identification(s) of recyclable logistics apparatus(es) entering the receiving party, as a sixth candidate delivery set;

the server analyzes whether an intersection of the above identified third candidate delivery set and the fourth candidate delivery set and an intersection of the fifth candidate delivery set and the sixth candidate delivery set respectively match the sending request so as to determine whether the transportation quantity during practical transportation meets the sending request.

After determining that the sending request matches the transportation quantity during practical transportation, the receiving party proceeds to discharge the goods, the receiving party sends a returning request to the server after discharging the goods, and the server analyzes the distribution and status of logistics apparatuses to select a closest or an optimal logistics third party and forwards the returning information to this logistics third party;

the server automatically identifies, according to identifications detected by the radar at two successive moments before and after empty recyclable logistics apparatus(es) leaves the receiving party, identification(s) of recyclable logistics apparatus(es) leaving the receiving party, as a seventh candidate delivery set;

the server automatically identifies, according to identifications detected by the radar at two successive moments before and after empty recyclable logistics apparatus(es) enters the logistics third party, identification(s) of recyclable logistics apparatus(es) entering the logistics third party, as an eighth candidate delivery set;

the server analyzes whether an intersection of the above identified fifth candidate delivery set and the sixth candidate delivery set matches the returning request so as to determine whether the transportation quantity during practical transportation meets the returning request.

The sending party, the receiving party and the logistics third party described in the procedures of the above method can all exist in plural forms. For example:

1. A plurality of sending parties send requests, and a certain logistics third party with enough empty containers storage is closest to all these sending parties, then the logistics third party will simultaneously issue multiple batches of fleets to supply the plurality of sending parties.

2. One sending party sends a request, and at this time none of the logistics third parties can supply enough empty containers, then a cloud will assign a plurality of optimal logistics third parties to simultaneously supply the sending party.

3. In addition to the above two kinds of multiple-to-one or one-to-multiple cases, a multiple-to-multiple case may also occur, such as two-to-three, three-to-five and so on.

4. When a sending party needs to supply a plurality of receiving parties, a plurality of logistics third parties will simultaneously assign a corresponding number of fleets to meet the transportation requirements.

5. The above situations will also occur when returning apparatuses, which will not be described herein again.

So far, a set of management method for a perfect transportation packing system has be formed. The delivery security is guaranteed through the registration mechanism and the entire transportation and usage process is tracked and confirmed through tags in logistics apparatuses, a radar, a router and a cloud set by users, thereby achieving a paperless and batched delivery operation mode.

The main benefits are:

1. All statistical work will be completed automatically by the system, thereby greatly reducing the workload and time required for the usage statistic and the quantity check of the recyclable logistics apparatuses.
2. The idle time of a logistics apparatus is shortened, so that the utilization rate is greatly increased.
3. The reliability and accuracy of information is improved.
4. The original point-to-point operations are transformed to point-to-surface operations, so that the entire logistics process is systematic and unified.
5. The traditional delivery mode is transformed to a paperless and batched delivery system.

The method embodiments of the present invention all can be realized by software, hardware and firmware etc. Regardless of the present invention is realized by software, or hardware, or firmware, instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

The sixth embodiment of the present invention relates to a delivery system of recyclable logistics apparatuses, each recyclable logistics apparatus is provided with a wireless tag, the wireless tag is configured to broadcast a wireless signal which at least contains an identification of the recycle logistics apparatus.

A first wireless sensing network is pre-set in a first delivery region, and a second wireless sensing network is pre-set in a second delivery region, wherein the wireless sensing network is used to receive wireless signals broadcasted by wireless tags of all recyclable logistics apparatuses in a coverage area of the wireless sensing network, and each wireless sensing network comprises at least one wireless sensing device.

The delivery system comprises the following components:

a first automatic recognition component, which is configured to automatically identify, according to detection results of a first wireless sensing network at two successive moments, identification(s) of recyclable logistics apparatus (es) leaving a first delivery region as a first candidate delivery set;

a second automatic recognition component, which is configured to automatically identify, according to detection results of a second wireless sensing network at two successive moments, identification(s) of recyclable logistics apparatus(es) entering a second delivery region as a second candidate delivery set;

a delivery result decision component, which is configured to take an intersection of the first candidate delivery set and the second candidate delivery set as a delivery result from the first delivery region to the second delivery region.

The present embodiment can automatically determine which recyclable logistics apparatus(es) is delivered from a first delivery region to a second delivery region, which is especially convenient and efficient when there are a lot of recyclable logistics apparatuses.

Figure 5:
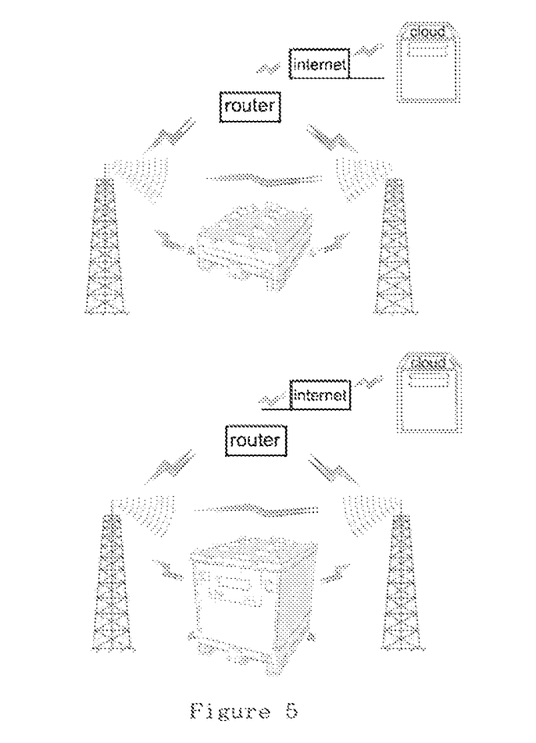
FIG. 5 is a schematic view of a signal wireless transmission scene for a delivery system of recyclable logistics apparatus according to a sixth embodiment of the present invention.

To achieve the above embodiment, specific technical solutions relate to how a wireless sensing network identifies identification(s) of recyclable logistics apparatus(es) in a delivery region and uploads it to a server, and a schematic view of a signal wireless transmission scene for a delivery system of recyclable logistics apparatus is shown in FIG. 5.

As shown in FIG. 5, a tag module that can periodically and wirelessly broadcast its own tag ID and status data is installed in all recyclable logistics containers.

A radar module is an independent electronic device that is a monitoring equipment deployed on a user to periodically scan wireless signals within a domain and receive broadcast data frames of tags.

A dedicated router is a mesh network which wirelessly connected radar modules and is composed in integrity, so that the entire system may seamlessly monitor a warehouse space, Radar(s) covers the entire user plant, and when a recyclable logistics container enters or leaves the plant, the recyclable logistics container is detected and a statistical calculation and a feedback are performed through software algorithms in a cloud.

All users of logistics containers and their potential associated customers are equipped with radar(s) for recyclable logistics container equipment on-site. Radar(s) can upload the logistics container information which can be detected currently at any time/instantly to the cloud system through a dedicated router in real-time, so that any users may supply status data of logistics containers when performing a transportation delivery.

Figure 6:
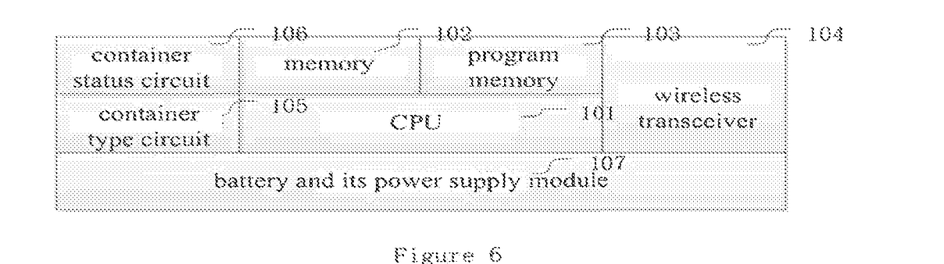
FIG. 6 is a structural view of a wireless tag for a delivery system of recyclable logistics apparatus according to a sixth embodiment of the present invention.
Figure 7:
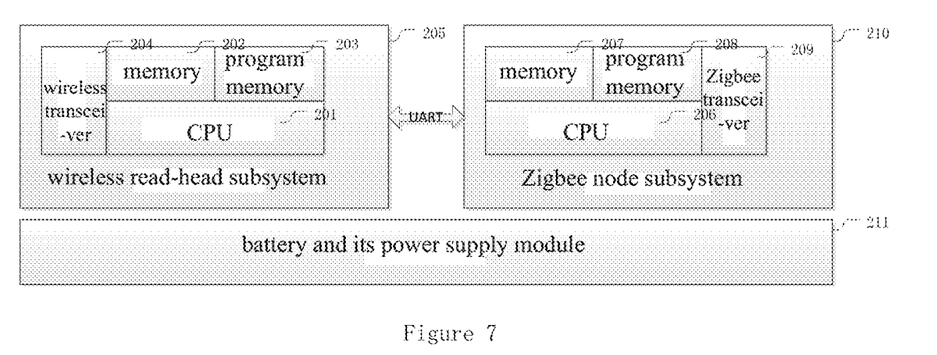
FIG. 7 is a structural view of a radar module for a delivery system of recyclable logistics apparatus according to a sixth embodiment of the present invention.
Figure 8:
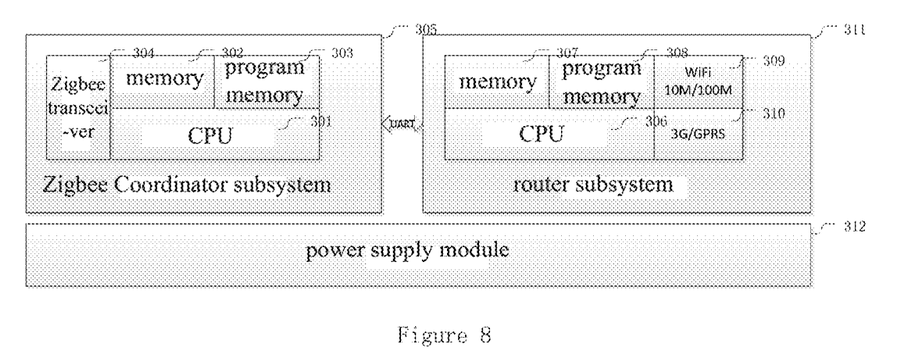
FIG. 8 is a structural view of a dedicated router for a delivery system of recyclable logistics apparatus according to a sixth embodiment of the present invention.

Schematic views of electronic portions of respective modules for wireless signal transmission in a delivery system are shown in FIGS. 6-8.

FIG. 6 is a structural view of a wireless tag. The wireless tag comprises a central processing unit CPU 101, a memory 102, a program memory 103, a wireless transceiver 104, a container type circuit 105, a container status circuit 106, a battery and its power supply module 107; the tag system can run a RTOS operating system such as TinyOS. Wherein The central processing unit CPU 101 is generally implemented by 8051 single-chip microcomputer, 32 Bit RISC or Cotex-M3; the memory 102 is a place where temporary data, variables and data structures run by programs are stored; the program memory 103 is a place where programs required for normal operation of the system are stored; the wireless transceiver 104 is a wireless transmitting/receiving component capable of operating at 315 MHz, 433 MHz, 800 MHz, 900 MHz and 2.4 GHz; the container type circuit 105 is a circuit which can be configured for distinguishing different uses when the container is produced; the container status circuit 106 is a circuit which allows the system to monitor whether the container is in an empty folded state or in an full open state; the battery and its power supply module 107 is a circuit which is powered by a battery and implements a control for low power consumption, so as to allow the system to operate efficiently for a long time.

FIG. 7 is a structure view of a radar module. The radar module comprises a wireless read-head subsystem 205, a Zigbee node subsystem 210, and a battery and its power supple module 211. The wireless read-head subsystem 205 interacts with the Zigbee node subsystem 210 via a UART. Wherein The wireless read-head subsystem 205 performs a scanning of local tags and receives information frames transmitted by tags. The wireless read-head subsystem 205 comprises a central processing unit CPU 201, a memory 202, a program memory 203 and a wireless transceiver 204. The central processing unit CPU 201 is generally implemented by 8051 single-chip microcomputer, 32 Bit RISC or Cotex-M3; the memory 202 is a place where temporary data, variables and data structures run by programs of the tag read-head subsystem 205 are stored; the program memory 203 is a place where programs required for normal operation of the tag read-head subsystem 205 are stored; the wireless transceiver 204 is a wireless transmitting/receiving component capable of operating at 315 MHz, 433 MHz, 800 MHz, 900 MHz and 2.4 GHz; the tag read-head subsystem 205 can run a RTOS operating system such as TinyOS.

The Zigbee node subsystem 210 comprises a central processing unit 206, a memory 207, a program memory 208 and a Zigbee transceiver 209. The central processing unit CPU 210 may generally be a processor core such as 51 single-chip microcomputer, 32-bit RISC processor, ARM Cortex-M3 and so on; the Zigbee node subsystem 210 generally runs a miniaturized RTOS operating system such as TinyOS; the memory 207 is a place where the Zigbee node subsystem 210 temporarily stores elements such as data structures, variables etc.; the program memory 208 stores programs required for normal operation of the Zigbee node subsystem 210; the Zigbee transceiver 209 is a RF (radio frequency) transceiver module which operates at 2.4 GHz and supports the Zigbee protocol; the Zigbee node subsystem 210 runs IEEE802.15.4 protocol suite and Zigbee link/router programs, and assumes the role of a node of the Zigbee network.

The battery and its power supply module 211 is a circuit which is powered by a batter and implements a control for low power consumption, so as to allow the system to operate efficiently for a long time.

FIG. 8 is a structure view of a dedicated router. The router comprises a power supply module 312, a Zigbee Coordinator subsystem 305 and a router subsystem 311. Wherein The Zigbee Coordinator subsystem 305 comprises a central processing unit CPU 301, a memory 304, a program memory 303 and a Zigbee transceiver 304. The central processing unit CPU 301 may generally be a processor core such as 51 single-chip microcomputer, 32-bit RISC processor, ARM Cortex-M3 and so on, and generally runs a miniaturized RTOS operating system such as TinyOS; the memory 302 is a place where this subsystem temporarily stores elements such as data structures, variables etc.; the program memory 303 stores programs required for normal operation of the Zigbee Coordinator subsystem; the Zigbee transceiver is a RF transceiver module which operates at 2.4 GHz and supports the Zigbee protocol. The Zigbee Coordinator subsystem 305 runs IEEE802.15.4 protocol suite and Zigbee link/router programs, and assumes the role of a coordinator of the Zigbee network, allowing other nodes to connect to the coordinator.

The router subsystem 311 comprises portions such as a central processing unit CPU 306, a memory 307, a program memory 308, WiFi/10M/100M309 and 3G/GPRS 310 and the like. The central processing unit CPU 306 may comprise a processor such as Cortex-48, Cortex-49 etc.;

the memory 307 is a place where temporary data required for system operating are stored; the program memory 308 is a place where programs for normal operation of the router subsystem 311 are stored; WiFi/10/100M309 is a local network access part, wherein WiFi may support IEE802.11b/g/n, wired Ethernet supports 10M/100M adaptive mode; 3G/GPS 310 is a mobile data network access part, which may be 2G GPRS network, or may be 3G network such as CDMA 2000, WCDMA, TD-SCDMA, or the like. The operating system run by the router subsystem 311 may be Linux operating system or a released version of Linux such as Ubuntu Server or Open-WRT etc.

The interaction between the Zigbee Coordinator subsystem 305 and the router subsystem 311 can be implemented via a communication link, such as UART.

The power supply module 312 generally supports 220 VAC electric supply access or the other DC power supply access such as 12 VDC, so as to provide a variety of power supplies required for the system.

The first embodiment is a method embodiment corresponding to the present embodiment, and the present embodiment can be implemented in cooperation with the first embodiment. Correlated technical details disclosed in the first embodiment are still available in the present embodiment, and will not be repeated herein in order to reduce repetition. Correspondingly, correlated technical details disclosed in the present embodiment can also be applied in the first embodiment.

The seventh embodiment of the present invention relates to a delivery system of recyclable logistics apparatuses. The seventh embodiment is improved based on the sixth embodiment, and the main improvements are: the delivery region is provided with a wireless sensing network comprising a plurality of wireless sensing devices, a detection range of the wireless sensing network covers the delivery region, the identification(s) of disappeared and added recyclable logistics apparatus(es) is obtained by detecting identifications of all recyclable logistics apparatuses in the entire delivery region at two successive moments and making comparison, thus the identification(s) of the recyclable logistics apparatus(es) leaving or entering the delivery region can be automatically identified. Specifically:

The first wireless sensing network covers the first delivery region, and the second wireless sensing network covers the second delivery region.

The first automatic recognition component comprises the following subcomponents:

a first identification obtaining subcomponent, which is configured to obtain at a first moment, identifications of all recyclable logistics apparatuses in the first delivery region detected by the first wireless sensing network, as a first identification set;

a second identification obtaining subcomponent, which is configured to obtain at a second moment after the first moment, identifications of all recyclable logistics apparatuses in the first delivery region detected by the first wireless sensing network, as a second identification set;

a first identification comparing subcomponent, which is configured to take the identification(s) of recyclable logistics apparatus(es) which disappears in the second identification set relative to the first identification set, as the first candidate delivery set.

The second automatic recognition component comprises the following subcomponents:

a third identification obtaining subcomponent, which is configured to obtain at a third moment after the second moment, identifications of all recyclable logistics apparatuses in the second delivery region detected by the second wireless sensing network, as a third identification set;

a fourth identification obtaining subcomponent, which is configured to obtain at a fourth moment after the third moment, identifications of all recyclable logistics apparatuses in the second delivery region detected by the second wireless sensing network, as a fourth identification set;

a second identification comparing subcomponent, which is configured to take the identification(s) of recyclable logistics apparatus(es) which is newly added in the fourth identification set relative to the third identification set, as the second candidate delivery set.

The second embodiment is a method embodiment corresponding to the present embodiment, and the present embodiment can be implemented in cooperation with the second embodiment. Correlated technical details disclosed in the second embodiment are still available in the present embodiment, and will not be repeated herein in order to reduce repetition. Correspondingly, correlated technical details disclosed in the present embodiment can also be applied in the second embodiment.

The eighth embodiment of the present invention relates to a delivery system of recyclable logistics apparatuses, the eighth embodiment is basically same as the seventh embodiment, and the main difference therebetween is that:

In the seventh embodiment, the delivery region is provided with a wireless sensing network comprising a plurality of wireless sensing devices, the first wireless sensing network covers the first delivery region, and the second wireless sensing network covers the second delivery region.

Whereas in the present embodiment, a first and a second wireless sensing devices are provided at an exit of the first delivery region in a direction of leaving the first delivery region, and a third and a fourth wireless sensing devices are provided at an entrance of the second delivery region in a direction of entering the second delivery region.

Correspondingly, the first automatic recognition component according to the sixth embodiment comprises the following subcomponent:

a first determining subcomponent, which is configured to determine an identification of a recyclable logistics apparatus as an identification of a recyclable logistics apparatus leaving the first delivery region if the first and the second wireless sensing devices have successively detected the identification of the recyclable logistics apparatus.

Correspondingly, the second automatic recognition component according to the sixth embodiment comprises the following subcomponent:

a second determining subcomponent, which is configured to determine an identification of a recyclable logistics apparatus as an identification of a recyclable logistics apparatus entering the second delivery region if the third and the fourth wireless sensing devices have successively detect the identification of the recyclable logistics apparatus.

In the present embodiment, two wireless sensing devices are provided respectively in a delivery region in a direction of leaving the delivery region and in a direction of entering the delivery region, detection ranges of the wireless sensing devices cover an exit and an entrance, and the two wireless sensing devices successively detect an identification of a recyclable logistics apparatus, thus the identification of the recyclable logistics apparatus leaving or entering the delivery region can be automatically detected.

The third embodiment is a method embodiment corresponding to the present embodiment, and the present embodiment can be implemented in cooperation with the third embodiment. Correlated technical details disclosed in the third embodiment are still available in the present embodiment, and will not be repeated herein in order to reduce repetition. Correspondingly, correlated technical details disclosed in the present embodiment can also be applied in the third embodiment.

The ninth embodiment of the present invention relates to a management system for sending apparatuses, and the management system for sending apparatuses comprises the following components:

a sending request receiving component, which is configured to receive a sending request message sent by a client corresponding to a sending party, the sending request message at least includes quantity of required recyclable logistics apparatuses and location information of the sending party;

a sending match notification component, which is configured to select a logistics third party that matches the sending request message in a database and send a sending notification message to a client corresponding to the logistics third party;

a third automatic recognition component, which is configured to automatically identify, according to detection results of a wireless sensing network corresponding to the logistics third party at two successive moments, identification(s) of recyclable logistics apparatus(es) leaving a delivery region of the logistics third party, as a third candidate delivery set;

a fourth automatic recognition component, which is configured to automatically identify, according to detection results of a wireless sensing network corresponding to the sending party at two successive moments, identification(s) of recyclable logistics apparatus(es) entering a delivery region of the sending party as a fourth candidate delivery set;

a first sending delivery component, which is configured to take an intersection of the third candidate delivery set and the fourth candidate delivery set as a sending delivery result from the delivery region of the logistics third party to the delivery region of the sending party;

a first sending delivery decision component, which is configured to compare the sending delivery result with the sending request message, and determine a sending delivery from the logistics third party to the sending party is completed if it is consistent.

Preferably, the following components are further comprised:

a fifth automatic recognition component, which is configured to automatically identify, according to detection results of a wireless sensing network corresponding to the sending party at two successive moments, identification(s) of recyclable logistics apparatus(es) leaving the delivery region of the sending party, as a fifth candidate delivery set;

a sixth automatic recognition component, which is configured to automatically identify, according to detection results of a wireless sensing network corresponding to the receiving party at two successive moments, identification(s) of recyclable logistics apparatus(es) entering a delivery region of the receiving party, as a sixth candidate delivery set;

a second sending delivery component, which is configured to take an intersection of the fifth candidate delivery set and the sixth candidate delivery set as a sending delivery result from the delivery region of the sending party to the delivery region of the receiving party;

a second sending delivery decision component, which is configured to compare the sending delivery result from the delivery region of the sending party to the delivery region of the receiving party with the sending request message, and determine a sending delivery from the sending party to the receiving party is completed if it is consistent.

The fourth embodiment is a method embodiment corresponding to the present embodiment, and the present embodiment can be implemented in cooperation with the fourth embodiment. Correlated technical details disclosed in the fourth embodiment are still available in the present embodiment, and will not be repeated herein in order to reduce repetition. Correspondingly, correlated technical details disclosed in the present embodiment can also be applied in the fourth embodiment.

The tenth embodiment of the present invention relates to a management system for returning apparatuses, the management system for returning apparatuses comprises the following components:

a returning request receiving component, which is configured to receive a returning request message sent by a client corresponding to a receiving party, the returning request message at least includes quantity of recyclable logistics apparatuses required to be returned and location information of the receiving party;

a returning match notification component, which is configured to select a logistics third party that matches the returning request message in a database and send a returning notification message to a client corresponding to the logistics third party;

a seventh automatic recognition component, which is configured to automatically identify, according to detection results of a wireless sensing network corresponding to the receiving party at two successive moments, identification(s) of recyclable logistics apparatus(es) leaving a delivery region of the receiving party, as a seventh candidate delivery set;

an eighth automatic recognition component, which is configured to automatically identify, according to detection results of a wireless sensing network corresponding to the logistics third party at two successive moments, identification(s) of recyclable logistics apparatus(es) entering a delivery region of the logistics third party, as an eighth candidate delivery set;

a returning delivery component, which is configured to take an intersection of the seventh candidate delivery set and the eighth candidate delivery set as a returning delivery result from the delivery region of the receiving party to the delivery region of the logistics third party;

a returning delivery decision component, which is configured to compare the returning delivery result with the returning request message, and determine a returning delivery is completed if it is consistent.

The fifth embodiment is a method embodiment corresponding to the present embodiment, and the present embodiment can be implemented in cooperation with the fifth embodiment. Correlated technical details disclosed in the fifth embodiment are still available in the present embodiment, and will not be repeated herein in order to reduce repetition. Correspondingly, correlated technical details disclosed in the present embodiment can also be applied in the fifth embodiment.

It should be noted that components disclosed in each device embodiment of the present invention are logical components, on the physical, a logic component can be a physical component, and may be part of a physical component, or implemented in combination of several physical components, and physical implementing methods for these logic components themselves are not the most important, the combination of the functions achieved by these logic components is the key to solving the technical problem disclosed in the present invention. Furthermore, in order to highlight innovative part of the present invention, the above device embodiments of the present invention do not introduce the components which are not related closely to solving the technical problem disclosed in the present invention, which does not indicate that the above device embodiments do not include other components.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to some preferred embodiments of this invention, this invention has been illustrated and described. But it should be understood to those skilled in the art that various other changes in the forms and details may be made without departing from the principles and scope of the invention.

The invention claimed is:

1. A delivery method of recyclable logistics apparatus, wherein each recyclable logistics apparatus is provided with a wireless tag, the wireless tag is configured to broadcast a wireless signal which at least contains an identification of the recycle logistics apparatus;

a first wireless sensing network is pre-set in a first delivery region, and a second wireless sensing network is pre-set in a second delivery region, wherein a wireless sensing network is configured to receive wireless signals broadcasted by wireless tags of all recyclable logistics apparatuses in a coverage area of the wireless sensing network, and each wireless sensing network comprises at least one wireless sensing device;

the delivery method comprises the following steps:

automatically identifying, according to detection results of the first wireless sensing network at two successive moments, identification(s) of recyclable logistics apparatus(es) leaving the first delivery region, as a first candidate delivery set;

automatically identifying, according to detection results of the second wireless sensing network at two successive moments, identification(s) of recyclable logistics apparatus(es) entering the second delivery region, as a second candidate delivery set;

taking an intersection of the first candidate delivery set and the second candidate delivery set as a delivery result from the first delivery region to the second delivery region, wherein the first wireless sensing network covers the first delivery region, and the second wireless sensing network covers the second delivery region, the step of "automatically identifying, according to detection results of the first wireless sensing network at two successive moments, identification(s) of recyclable logistics apparatus(es) leaving the first delivery region, as a first candidate delivery set" comprises the following substeps;

obtaining at a first moment, identifications of all recyclable logistics apparatuses in the first delivery region detected by the first wireless sensing network, as a first identification set;

obtaining at a second moment after the first moment, identifications of all recyclable logistics apparatuses in the first delivery region detected by the first wireless sensing network, as a second identification set;

taking identification(s) of recyclable logistics apparatus(es) which is not included in the second identification set relative to the first identification set as the first candidate delivery set the step of "automatically identifying, according to detection results of the second wireless sensing network at two successive moments, identification(s) of recyclable logistics apparatus(es) entering the second delivery region, as a second candidate delivery set" comprises the following substeps;

obtaining at a third moment after the second moment, identifications of all recyclable logistics apparatuses in the second delivery region detected by the second wireless sensing network, as a third identification set;

obtaining at a fourth moment after the third moment, identifications of all recyclable logistics apparatuses in the second delivery region detected by the second wireless sensing network, as a fourth identification set; and taking identification(s) of recyclable logistics apparatus(es) which is newly added in the fourth identification set relative to the third identification set as the second candidate delivery set.

2. The delivery method according to claim 1, wherein a first and a second wireless sensing devices are provided at an exit of the first delivery region in a direction of leaving the first delivery region; and a third and a fourth wireless sensing devices are provided at an entrance of the second delivery region in a direction of entering the second delivery region;

the step of "automatically identifying, according to detection results of the first wireless sensing network at two successive moments, identification(s) of recyclable logistics apparatus(es) leaving the first delivery region" comprises the following steps;

determining an identification of a recyclable logistics apparatus as an identification of a recyclable logistics apparatus leaving the first delivery region if the first and the second wireless sensing devices have successively detected the identification of the recyclable logistics apparatus;

the step of "automatically identifying, according to detection results of the second wireless sensing network at two successive moments, identification(s) of recyclable logistics apparatus(es) entering the second delivery region" comprises the following steps;

determining an identification of a recyclable logistics apparatus as an identification of a recyclable logistics apparatus entering the second delivery region if the third and the fourth wireless sensing devices have successively detected the identification of the recyclable logistics apparatus.

3. A delivery system of recyclable logistics apparatus, wherein each recyclable logistics apparatus is provided with a wireless tag, the wireless tag is configured to broadcast a wireless signal which at least contains an identification of the recycle logistics apparatus;

a first wireless sensing network is pre-set in a first delivery region, and a second wireless sensing network is pre-set in a second delivery region, wherein a wireless sensing network is configured to receive wireless signals broadcasted by wireless tags of all recyclable logistics apparatuses in a coverage area of the wireless sensing network, and each wireless sensing network comprises at least one wireless sensing device;

the delivery system comprises the following components:

a first automatic recognition component, which is configured to automatically identify, according to detection results of the first wireless sensing network at two successive moments, identification(s) of recyclable logistics apparatus(es) leaving the first delivery region, as a first candidate delivery set;

a second automatic recognition component, which is configured to automatically identify, according to detection results of the second wireless sensing network at two successive moments, identification(s) of recyclable logistics apparatus(es) entering the second delivery region, as a second candidate delivery set;

a delivery result decision component, which is configured to take an intersection of the first candidate delivery set and the second candidate delivery set as a delivery result from the first delivery region to the second delivery region, wherein the first wireless sensing network covers the first delivery region, and the second wireless sensing network covers the second delivery region;

the first automatic recognition component comprises the following subcomponents:

a first identification obtaining subcomponent, which is configured to obtain at a first moment, identifications of all recyclable logistics apparatuses in the first delivery region detected by the first wireless sensing network, as a first identification set;

a second identification obtaining subcomponent, which is configured to obtain at a second moment after the first moment, identifications of all recyclable logistics apparatuses in the first delivery region detected by the first wireless sensing network, as a second identification set;

a first identification comparing subcomponent, which is configured to take identification(s) of recyclable logistics apparatus(es) which is not included in the second identification set relative to the first identification set, as the first candidate delivery set;

the second automatic recognition component comprises the following subcomponents:

a third identification obtaining subcomponent, which is configured to obtain at a third moment after the second moment, identifications of all recyclable logistics apparatuses in the second delivery region detected by the second wireless sensing network, as a third identification set;

a fourth identification obtaining subcomponent, which is configured to obtain at a fourth moment after the third moment, identifications of all recyclable logistics apparatuses in the second delivery region detected by the second wireless sensing network, as a fourth identification set; and a second identification comparing subcomponent, which is configured to take identification(s) of recyclable logistics apparatus(es) which is newly added in the fourth identification set relative to the third identification set, as the second candidate delivery set.

4. The delivery system according to claim 3, wherein a first and a second wireless sensing devices are provided at an exit of the first delivery region in a direction of leaving the first delivery region; and a third and a fourth wireless sensing devices are provided at an entrance of the second delivery region in a direction of entering the second delivery region;

the first automatic recognition component comprises the subcomponent:

a first determining subcomponent, which is configured to determine an identification of a recyclable logistics apparatus as an identification of a recyclable logistics apparatus leaving the first delivery region if the first and the second wireless sensing devices have successively detected the identification of the recyclable logistics apparatus;

the second automatic recognition component comprises the subcomponent:

a second determining subcomponent, which is configured to determine an identification of a recyclable logistics apparatus as an identification of a recyclable logistics apparatus entering the second delivery region if the third and the fourth wireless sensing devices have successively detected the identification of the recyclable logistics apparatus.

* * * * *